United States Patent
Wang et al.

(10) Patent No.: US 11,449,669 B2
(45) Date of Patent: *Sep. 20, 2022

(54) INPUT FACILITATION FOR FORMS IN WEB RESOURCES

(71) Applicant: Google LLC, Mountain View, CA (US)

(72) Inventors: David Wang, Saratoga, CA (US); Ulas Kirazci, Mountain View, CA (US); Joshua Richard Williams, Menlo Park, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/327,261

(22) Filed: May 21, 2021

(65) Prior Publication Data

US 2021/0279412 A1 Sep. 9, 2021

Related U.S. Application Data

(63) Continuation of application No. 15/858,586, filed on Dec. 29, 2017, now Pat. No. 11,017,163.

(51) Int. Cl.
| | | |
|---|---|---|
| *G06F 16/10* | (2019.01) | |
| *G06F 40/174* | (2020.01) | |
| *G06F 40/30* | (2020.01) | |
| *G06F 40/221* | (2020.01) | |
| *G06F 40/274* | (2020.01) | |
| *G06F 16/958* | (2019.01) | |

(52) U.S. Cl.
CPC .......... *G06F 40/174* (2020.01); *G06F 16/986* (2019.01); *G06F 40/221* (2020.01); *G06F 40/274* (2020.01); *G06F 40/30* (2020.01)

(58) Field of Classification Search
None
See application file for complete search history.

(56) References Cited

U.S. PATENT DOCUMENTS

| | | |
|---|---|---|
| 4,969,097 A | 11/1990 | Levin |
| 6,305,008 B1 | 10/2001 | Vaidyanathan et al. |
| 7,185,271 B2 | 2/2007 | Lee et al. |

(Continued)

OTHER PUBLICATIONS

European Patent Office; Communication Pursuant to Article 94(3) EPC issued in Application No. 18766570.8; 6 pages; dated Sep. 28, 2021.

(Continued)

*Primary Examiner* — Maikhanh Nguyen
(74) *Attorney, Agent, or Firm* — Middleton Reutlinger (57) ABSTRACT

Methods, systems, and apparatus, including computer programs encoded on a computer storage medium, for facilitating input by a user into a form. In one aspect, a method include actions of obtaining a web resource that includes a form, determining a particular field of the form has been selected, determining an intent that corresponds to the form from a first semantic tag in the web resource, determining a parameter of the intent that corresponds to the particular field of the form from a second semantic tag in the web resource, determining a value to suggest for the particular field based at least on the intent and the parameter of the intent, and providing the value for output as a suggestion of input for the particular field.

20 Claims, 4 Drawing Sheets

(56) References Cited

U.S. PATENT DOCUMENTS

| | | | |
|---|---|---|---|
| 7,216,292 | B1 | 5/2007 | Snapper et al. |
| 7,254,569 | B2 * | 8/2007 | Goodman .............. G06F 40/174 |
| 7,685,144 | B1 | 3/2010 | Katragadda |
| 7,908,287 | B1 | 3/2011 | Katragadda |
| 8,095,476 | B2 | 1/2012 | Biemer et al. |
| 8,234,561 | B1 * | 7/2012 | Bourdev ............... G06F 40/174 |
| | | | 715/224 |
| 8,595,230 | B1 | 11/2013 | Djabarov |
| 8,661,330 | B1 | 2/2014 | Kilat et al. |
| 8,700,992 | B1 | 4/2014 | Sedov |
| 8,713,042 | B1 | 4/2014 | Zinenko et al. |
| 8,751,535 | B1 | 6/2014 | Kim |
| 9,665,963 | B1 | 5/2017 | Chang |
| 10,019,485 | B2 | 7/2018 | Jung et al. |
| 10,089,292 | B2 | 10/2018 | Shetty et al. |
| 10,133,718 | B2 * | 11/2018 | Iasi ....................... G06F 40/174 |
| 10,241,648 | B2 | 3/2019 | Houseworth |
| 10,416,854 | B2 * | 9/2019 | Leme ................... G06F 40/174 |
| 10,776,571 | B2 * | 9/2020 | Meschkat .......... G06Q 30/0633 |
| 2004/0039988 | A1 | 2/2004 | Lee et al. |
| 2005/0257148 | A1 | 11/2005 | Goodman et al. |
| 2008/0154824 | A1 | 6/2008 | Weir et al. |
| 2008/0215976 | A1 | 9/2008 | Bierner et al. |
| 2008/0235567 | A1 | 9/2008 | Raj et al. |
| 2011/0029862 | A1 | 2/2011 | Scott et al. |
| 2011/0214067 | A1 | 9/2011 | Tanaka |
| 2012/0136756 | A1 | 5/2012 | Jitkoff et al. |
| 2013/0290410 | A1 | 10/2013 | Zhang |
| 2013/0298007 | A1 | 11/2013 | Cullen et al. |
| 2014/0359449 | A1 | 12/2014 | Stekkelpak |
| 2016/0019197 | A1 | 1/2016 | Iasi et al. |
| 2016/0188560 | A1 | 6/2016 | Chen |
| 2016/0217119 | A1 | 7/2016 | Dakin et al. |
| 2016/0246847 | A1 | 8/2016 | Jung et al. |
| 2017/0046622 | A1 * | 2/2017 | Gaither ................. G06F 40/247 |
| 2017/0075873 | A1 | 3/2017 | Shetty et al. |
| 2017/0249059 | A1 | 8/2017 | Houseworth |
| 2017/0322920 | A1 * | 11/2017 | Meschkat .............. G06Q 50/12 |
| 2017/0357627 | A1 * | 12/2017 | Peterson ................. G06F 7/023 |
| 2018/0260086 | A1 * | 9/2018 | Leme .................... G06F 40/174 |

OTHER PUBLICATIONS

Intellectual Property India: Examination Report issued for Application No. 201927043963 dated Apr. 17, 2021.

PCT International Preliminary Report on Patentability in International Application No. PCT/US2018/048793 dated Apr. 7, 2020. 7 pages.

PCT International Search Report and Written Opinion issued in International Application No. PCT/US2018/048793 dated Jan. 27, 2019. 5 pages.

PCT International Written Opinion in International Application No. PCT/US2018/048793 dated Dec. 12, 2019. 5 pages.

PCT International Search Report and Written Opinion issued in International Application No. PCT/US2018/048793 dated Dec. 3, 2018. 13 pages.

developers.google.com [online] "Help users checkout faster with Autofill," Last update: Sep. 26, 2017, [retreived on Dec. 29, 2017] Retrieved from Internet: URL<https://developers.google.com/web/updates/2015/06/checkout-faster-with-autofill> 10 pages.

developers.google.com [online] "Helpers," Last update: Dec. 16, 2017, [retreived on Dec. 29, 2017] Retrieved from Internet: URL<https://developers.google.com/actions/assistant/helpers> 11 pages.

developers.google.com [online] "Intents," Last update: Dec. 22, 2017, [retreived on Dec. 29, 2017] Retrieved from Internet: URL<https://developers.google.com/actions/reference/rest/intents> 4 pages.

schema.org [online] "Getting started with schema.org using Microdata," Available on or before Jun. 6, 2011 [retrieved an Dec. 29, 2017] Retrieved from Internet: URL<http://schema.org/docs/gs.html> via the Wayback Machine Internet Archive<https://web.archive.org/web/20110701000000*/http://schema.org/docs/gs.html> 8 pages.

The Korean Intellectual Property Office; Notice of Office Action issued in Application No. 10-2019-7034628; 11 pages; dated Jun. 30, 2021.

The Korean Intellectual Property Office; Notice of Allowance issued in Application No. 10-2019-7034628; 3 pages; dated Nov. 30, 2021.

Korean Intellectual Property Office; Notice of Office Action issued in Application Ser. No. KR10-2022-7006395; 11 pages; dated May 24, 2022.

* cited by examiner

INPUT FACILITATION FOR FORMS IN WEB RESOURCES

TECHNICAL FIELD

This disclosure generally relates to user input.

BACKGROUND

A computing device may receive user input through fields of forms. For example, a computing device may render a webpage for making a reservation, where the form includes fields in which a user may specify a time period for the reservation.

SUMMARY

In general, an aspect of the subject matter described in this specification may involve a process for facilitating input by a user into a form. Users may provide input to forms for a variety of reasons. For example, to have flowers delivered by an online flower delivery service, a user may input information regarding a recipient and a delivery date into a form in a webpage provided by the online flower delivery service. In another example, to reserve a car through a car rental service's website, a user may input information specifying a time period for renting a car.

Providing input for a form may be a time consuming process. For example, a user may need to type in a long name and address into text fields of a form. In another example, a user may forget the dates they need a car rental and need to first look up the dates before inputting the dates in a form's date field. Form autocompletion may help users input values into forms. For example, form autocompletion may be used to determine that a particular field of a form for booking a car rental has a name with a value of "Start_Date" and provide options for all different values that the user previously provided in fields that have a name with a value of "Start_Date."

However, form autocompletion may be limited in that it may not consider the context of an action being taken and only consider a name of a particular field. For example, a user may have just booked a flight to Boston and may actually want the particular field to have the date that their flight lands in Boston, but autocompletion may suggest all values that the user previously input for fields with names of "Start_Date." Accordingly, autocompletion may suggest values that the user would not use and, if the user never entered the date the user's flight lands in Boston into a field with a name of "Start_Date," autocompletion may also not provide the date that the user's flight lands in Boston as a suggestion.

To better provide suggestions, a system may use web resources that have semantic tags that describe context of a form and fields of the form. A semantic tag may be text in a markup language that describes a context for a form or field. For example, the system may use a semantic tag in the form of an itemprop attribute inside a form tag where a value of the itemtype attribute describes an intent corresponding to the form. In another example, the system may use a semantic tag in the form of an itemprop attribute inside an input tag where a value of the itemprop attribute describes a parameter of the intent. An intent that corresponds to a form may be an action that a user is performing when completing the form. For example, an intent that corresponds to a form may be "Car_Rental" for a form that a user completes to rent a car, an intent that corresponds to another form may be "Send_Flowers" for a form that a user completes to send flowers, and an intent that corresponds to another form may be "Book_Room" for a form that a user completes to book a room at a hotel.

The system may determine an intent that corresponds to a form and a parameter of that intent for a field based on the tags. For example, the system may inspect a form tag in a web resource for reserving a car rental and identify that an attribute of itemtype has a value of "Car_Rental" and the user has selected a field with an attribute of itemprop with a value of "Start_Date," in response, determine from the value of "Car_Rental" that the user intends to book a car rental, determine from the value of "Start_Date" that a suggestion for a parameter representing a start date for booking a car rental is likely to be helpful to the user, determine that the user is likely to want the start date of the car rental to match when a user's flight lands, determine that the user has just booked a flight landing on Dec. 20, 2017, and determine to suggest the date of Dec. 20, 2017 that the flight lands for the field.

Particular embodiments of the subject matter described in this specification can be implemented so as to realize one or more of the following advantages. The system may enable users to more quickly provide input into forms. For example, the system may enable users to simply select a suggestion that includes multiple letters to use as input instead of manually typing in each letter of an input. Allowing users to more quickly provide input into forms may enable the system to reduce the amount of power usage and computational processing that the system uses to receive the input as less time and user interactions may be needed to provide input. The system may enable users to more accurately provide input into forms. For example, enabling users to select suggestions may reduce the chances of a user mistyping input into a field or misremembering input to provide for a field. Allowing users to more accurately provide input into forms may enable the system to reduce the amount of power usage and computational processing that the system uses to receive the input as time and user interactions needed by users to correct mistakes may be reduced.

For situations in which the systems discussed here collect personal information about users, or may make use of personal information, the users may be provided with controls allowing the user to make an election as to both if and when systems, programs or features described herein may enable collection of user information (e.g., information about a user's social network, social actions or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

In some aspects, the subject matter described in this specification may be embodied in methods that may include the actions of obtaining a web resource that includes a form, determining a particular field of the form has been selected, determining an intent that corresponds to the form from a first semantic tag in the web resource, determining a parameter of the intent that corresponds to the particular field of the form from a second semantic tag in the web resource, determining a value to suggest for the particular field based at least on the intent and the parameter of the intent, and providing the value for output as a suggestion of input for the particular field.

Other versions include corresponding systems, apparatus, and computer programs, configured to perform the actions of the methods, encoded on computer storage devices.

These and other versions may each optionally include one or more of the following features. For instance, in some implementations determining a value to suggest for the particular field based at least on the intent and the parameter of the intent includes providing the intent and the parameter to a personalized suggestion server and receiving the value from the personalized suggestion server in response to providing the intent and the parameter to the personalized suggestion server. In certain aspects, obtaining a web resource that includes a form includes obtaining the web resource that includes the form from a web resource server that is different from the personalized suggestion server.

In some aspects, determining an intent that corresponds to the form from a first semantic tag in the web resource includes determining the intent from markup language, embedded in the web resource, of a form tag that defines the form. In some implementations determining the intent from markup language of a form tag that defines the form includes determining the intent from a value of an itemtype attribute in the form tag. In certain aspects, determining a parameter of the intent that corresponds to the particular field of the form from a second semantic tag in the web resource includes determining the parameter of the intent from markup language, embedded in the web resource, of an input tag that defines the particular field.

In some aspects, determining the parameter of the intent from markup language of an input tag that defines the particular field includes determining the parameter of the intent from a value of an itemprop attribute in the input tag. In some implementations, providing the value for output as a suggestion of input for the particular field includes providing the value for display in a graphical panel. In certain aspects, determining a particular field of the form has been selected includes determining that focus is set on the particular field of the form. In some aspects, actions include receiving an indication from a user to use the value suggested for the particular field and in response to receiving the indication from the user to use the value suggested for the particular field, populating the particular field with the value. In some implementations, the value includes personal information regarding a user that has not previously been provided by the user for populating a form.

The details of one or more implementations of the subject matter described in this specification are set forth in the accompanying drawings and the description below. Other potential features, aspects, and advantages of the subject matter will become apparent from the description, the drawings, and the claims.

DESCRIPTION OF DRAWINGS

Like reference symbols in the various drawings indicate like elements.

DETAILED DESCRIPTION

Figure 1:
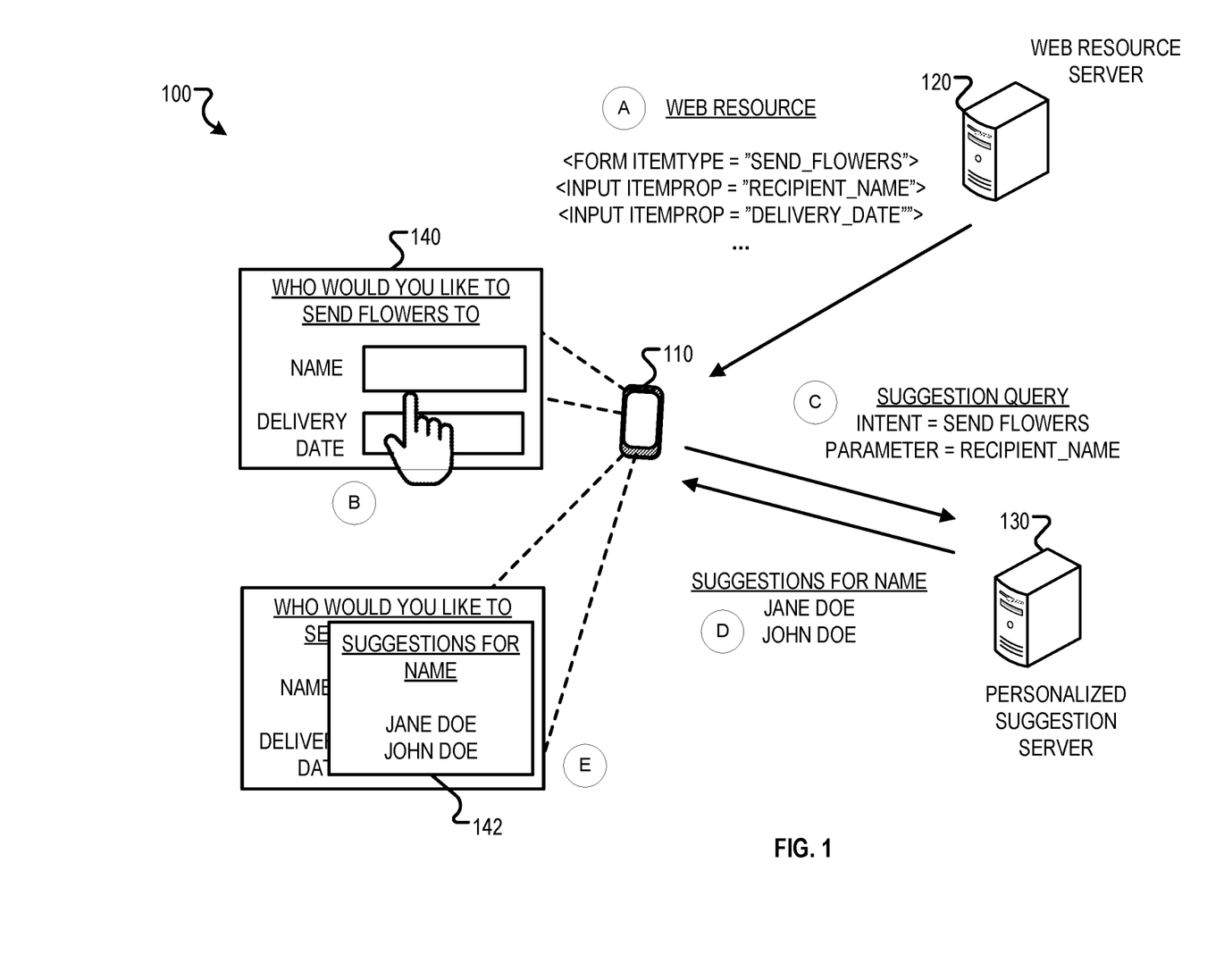
FIG. 1 is a block diagram of an example system that facilitates input by a user into a form.

FIG. 1 is block diagram of an example system 100 that facilitates input by a user into a form. Briefly, and as described in further detail below, the system 100 may include a user device 110 that displays a form of a web resource with fields that a user may interact with to obtain personalized suggestions for those fields, a web resource server 120 that may provide the web resource, and a personalized suggestion server 130 that provides the personalized suggestions for those fields.

The web resource server 120 may be a server that provides a web resource to the user device 110. For example, the web resource server 120 may host a web resource that includes a form for receiving user input and that is accessed using an universal resource locator (URL) of "WWW.EXAMPLE.COM/SEND_FLOWERS.HTML" and, in response to a request received from the user device 110 to access the URL, provide the web resource. The web resource may include semantic tags in markup language that describe context of the form and fields. For example, web resource may be for sending flowers and include a form tag with an attribute of itemtype with a value of "Send_Flowers," a first input tag with an attribute of itemprop with a value of "Recipient_Name," and a second input tag with an attribute of itemprop with a value of "Delivery Date."

The web resource server 120 may additionally receive input from a submission of the form and then perform an action based on the input. For example, the web resource server 120 may receive an indication that a user has provided "Jane Doe" as input in a field for a recipient and "Dec. 20, 2017" as input in a field for a delivery date and, in response, initiate a process to deliver flowers to Jane Doe on Dec. 20, 2017.

The user device 110 may be mobile computing device, personal digital assistants, cellular telephones, smartphones, laptop, desktop, workstation, and other computing devices. The user device 110 may display a form to the user. For example, the user device 110 may display a graphical user interface that includes a form 140 for specifying to whom to send flowers. A form be included in a web resource, e.g., a web page, and include one or more labelled fields for the user to enter user input. For example, the form 140 includes a field labeled "NAME" for a user to enter the user's name and a field labeled "DELIVERY DATE" for the user to provide the user's fax number. The fields may be text entry fields in which the user may enter text. Alternatively or additionally, the fields may be non-text entry fields. For example, the fields may be a date field, a checkbox, a dropdown, a combo box, or a non-textual entry field.

The user device 110 may determine a user has selected a field of the form, and in response, provide a suggestion query to the personalized suggestion server 130. A suggestion query may be a request for a suggestion. For example, the user device 110 may determine that a user has touched a name field displayed on the user device and, in response, provide to the personalized suggestion server 130 a suggestion query that indicates a suggestion is desired for an intent of "Send_Flowers" and a parameter of "Recipient_Name." In another example, the user device 110 may determine that a user has moved a cursor over a name field displayed on the user device and clicked on a keyboard or mouse button and, in response, provide a suggestion query that indicates a suggestion is desired for an intent of "Send_Flowers" and a parameter of "Recipient_Name."

A field of a form may be considered to be selected when a focus of a user interface is set on the field. For example, focus may be considered to be set on a text entry field when the field is active so a cursor is blinking in the field and the field is ready to accept text input. In another example, focus may be considered to be set on a check box field when the field is highlighted so that pressing a "SPACE" button toggles the field between "CHECKED" and "UNCHECKED." In yet another example, focus may be considered not to be set on a text entry field when the field is not active so a cursor is not blinking in the field and the field is not ready to accept text input.

In response to providing a suggestion query to the personalized suggestion server 130, the user device 110 may obtain a value for suggestion. For example, the user device 110 may obtain the values of "Jane Doe" and "John Doe" from the personalized suggestion server 130. The user device 110 may then output the value as a suggestion to a user. For example, the user device 110 may display a graphical panel 142 that includes the text "Suggestions for name," "Jane Doe," and "John Doe." The user device 110 may then receive a selection from a user indicating whether to use the value. For example, the user device 110 may determine that a user has touched the displayed name "Jane Doe" and, in response, determine that the user has selected to use the value "Jane Doe" for the particular field. In another example, the user device 110 may determine that a user has touched a portion of the display where the graphical panel 142 isn't shown and, in response determine that the user has selected not to use the suggested value.

If the user device 110 determines that the user has selected to use a suggested value for a particular field, the user device 110 may then populate the particular field with the suggested value. For example, after the user touches the displayed name "Jane Doe," without further input form the user, the user device 110 may set the value of the particular field to "Jane Doe." If the user device 110 determines that the user has selected not to use a suggested value for a particular field, the user device 110 may instead return focus to the field and allow a user to manually input a value. For example, after the user touches a portion of the display that is not part of the graphical panel 142 showing suggestions, the user device 110 may stop displaying the panel 142 and instead show a keyboard to allow a user to manually and individually input letters that form a name.

The personalized suggestion server 130 may receive suggestion queries from the user device 110 and, in response, provide results that are values for suggestion. For example, the personalized suggestion server 130 may receive from the user device 110 a suggestion query that includes "intent=Send_Flowers" and "parameter=Recipient_Name" and, in response, provide "Jane Doe" and "John Doe."

In the system 100, suggestions provided by the personalized suggestion server 130 to the user device 110 may not be accessible by the web resource server 120 until a user submits that information to the web resource server by using the suggestion as input in a form in a web resource provided by the web resource server 120. Accordingly, the system 100 may increase security by limiting the web resource server's 120 access to information of a user available to the personalized suggestion server 130.

Figure 2:
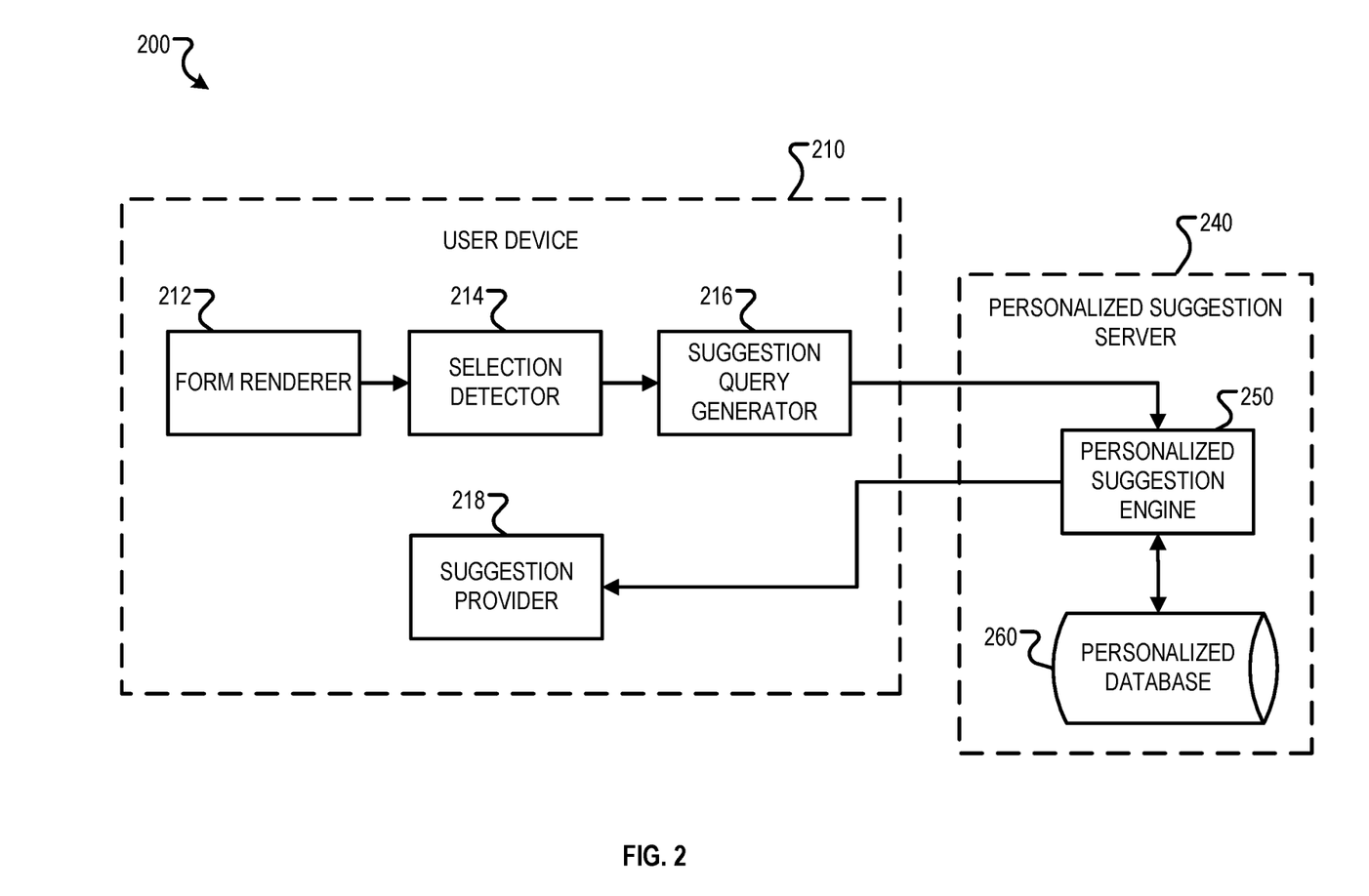
FIG. 2 is a block diagram of a user device for facilitating input by a user into a form.

FIG. 2 is a block diagram of a user device for facilitating input by a user into a form. Briefly, and as described in further detail below, the system 200 may include a user device 210 and a personalized suggestion server 240. In one example, the user device 210 may be the user device 110 of FIG. 1 and the personalized suggestion server 240 may be personalized suggestion server 130 of FIG. 1. However, the user device 210 may be different from the user device 110 and the personalized suggestion server 240 may be different from the personalized suggestion server 130.

The user device 210 may include form renderer 212, selection detector 214, suggestion query generator 216, and suggestion provider 218. In some implementations, the form renderer 212, selection detector 214, suggestion query generator 216, and suggestion provider 218 may be part of a web browser. For example, the form renderer 212, selection detector 214, suggestion query generator 216, and suggestion provider 218 may be included in different web browsers and configured to operate when the web browsers access web resources that indicate the web resources are to be processed by the form renderer 212, selection detector 214, suggestion query generator 216, and suggestion provider 218. Accordingly, the system 200 may be used with various different types of web browsers.

The form renderer 212 may render a form including one or more fields on a display. For example, the form renderer 212 may obtain a web resource that includes a form and generate a graphical user interface including the form.

The selection detector 214 may determine that the user has selected a field of the form. For example, the selection detector 214 may detect that a user has touched a text field on a display that has an input tag with an itemprop attribute with a value of "Start_Date" that indicates the field is for indicating a start date of a car rental and is included in a form with a form tag with an itemtype attribute of "Car_Rental" that indicates the form is for renting a car.

The selection detector 214 may determine that a user has selected a field of form based on automatically inserting script, e.g., JavaScript, into the web resource. For example, the selection detector 214 may initially parse the Hypertext Markup Language (HTML) defining a web resource to identify tags for fields of a form and then insert JavaScript handlers into the web resource that trigger an event when the respective fields are selected. The selection detector 214 may then detect when the events are triggered and determine that the corresponding field has been selected.

The suggestion query generator 216 may generate a suggestion query. For example, the suggestion query generator 216 may generate a suggestion query that includes an indication of intent as "Car_Rental" and an indication of a parameter of "Start_Date" for the intent.

The suggestion query generator 216 may generate the suggestion query based on parsing the markup language of the web resource for semantic tags. For example, the suggestion query generator 216 may determine that an input tag of a field that is selected has an itemprop attribute with a value of "Start_Date" and that the form tag of the form that includes the field has an itemtype attribute with a value of "Car_Rental" and, in response, determine to generate a suggestion query indicating the value of "Start_Date" as a parameter for an intent of "Car_Rental."

The suggestion query generator 216 may generate a suggestion query that includes an identifier of the user. For example, the suggestion query generator 216 may generate a suggestion query that includes "intent="Car_Rental," "parameter="Start_Date," and "userid="56482," where "564842" is a unique identifier for the user.

In some implementations, the suggestion query generator 216 may also include information already input by a user into the form in the suggestion query values. For example, when a user selects a field with a semantic tag of "End_Date" that indicates the field is for a parameter specifying an end date of a rental reservation, the suggestion query generator 216 may additionally include "parameter Start_Date=Dec. 20, 2017" to provide additional context for the personalized suggestion server 240 to provide a suggestion that the user is likely to find helpful.

The suggestion provider 218 may obtain a value for output as a suggestion from the personalized suggestion server 240 in response to the personalized suggestion query. For example, the suggestion provider 218 may receive a result of "Dec. 20, 2017" in response to the suggestion query including "intent="Car_Rental" and "parameter= "Start_Date." In response to receiving the result, the suggestion provider 218 may provide the value for output as a suggestion of input. For example, the suggestion provider 218 may display a graphical panel that overlays a portion of the web resource, where the graphical panel includes "Dec. 20, 2017" as a selectable option.

The suggestion provider 218 may receive a selection of the user that indicates whether to use a suggested value and, in response, to determining the user has selected to use the suggested value, populate the selected field with the selected value. For example, the suggestion provider 218 may receive a selection of "Dec. 20, 2017" and, in response, automatically populate the selected field with "Dec. 20, 2017" and stop displaying the graphical panel with the suggestions. Automatically populating a selected field may include setting a value of the selected field to be text of a selected result without receiving additional user input after receiving a user selection of a suggested value.

In some implementations, the suggestion provider 218 may populate the form based on analyzing a selected field. For example, the provider 218 may receive a suggested value of "Dec. 20, 2017," determine that the user has selected to use the selected value, determine that the selected field is a drop down menu, and select the option from the drop down menu with the value of "Dec. 20, 2017." The suggestion provider 218 may determine how to populate a selected field based on a particular result by referencing a control value mapping. The control value mapping may define rules for how a field should be populated based on results. For example, the control value mapping may define a rule that a checkbox field should be checked if a result is "YES" and unchecked if a result is "NO." In another example, the control value mapping may define a rule that a drop down menu field with a particular option that matches a result should have the option that matches the result be selected.

The personalized suggestion server 240 may include a personalized suggestion engine 250 and a personalized database 260. The personalized suggestion server 240 may receive a suggestion query transmitted over a network, e.g., the Internet or local area network, by the user device 210. The personalized suggestion engine 250 may obtain a suggestion query and provide a value to suggest in response. For example, the personalized suggestion engine 250 may obtain the suggestion query that includes "intent="Car_Rental," "parameter="Start_Date," and "userid="56482, and generate a value of "Dec. 20, 2017."

The personalized suggestion engine 250 may generate the suggestion query result based on searching for data stored in the personalized database 260 that the personalized suggestion engine 250 determines is more likely to be a value that the user would input for the particular field. For example, in response to obtaining the suggestion query, "intent="Car_Rental," "parameter="Start_Date," and "userid="56482, the personalized suggestion engine 250 may search the personalized database 260 for personal data associated with "userid 564842," determine that a user with userid 564842 just received an e-mail describing a flight they just booked to Boston that lands on Dec. 20, 2017, and, in response, suggest a value of Dec. 20, 2017 based on the e-mail.

The personalized suggestion engine 250 may suggest values based on the intent and parameter indicated in received suggestion queries. For example, in response to obtaining the suggestion query, "intent="Car_Rental," "parameter="Start_Date," and "userid="56482, the personalized suggestion engine 250 may suggest a value of Dec. 20, 2017 based on the e-mail as described above and in response to obtaining the suggestion query, "intent="Car_Rental," "parameter="End_Date," and "userid="56482, the personalized suggestion engine 250 may determine that a user with userid 564842 just received an e-mail describing a flight they just booked to Boston that lands on Dec. 20, 2017 and returning flight that leaves on Dec. 23, 2017, and, in response suggest a value of Dec. 23, 2017 based on the e-mail.

The personalized suggestion engine 250 may determine values to suggest based on determining types of information that are more likely to be relevant for particular parameters of particular intents. For example, the personalized suggestion engine 250 may include a log of user interactions and determine from the logs that typically after a user books a flight and accesses a form that is tagged with an intent of "Car_Rental," the user puts in the landing date of the flight into an input tagged with a parameter of "Start_Date." In response in the example, personalized suggestion engine 250 may then suggest landing dates of flights of flights for a user when the personalized suggestion engine 250 receives suggestion queries that indicate an intent of "Car_Rental" and a parameter of "Start_Date."

The personalized suggestion engine 250 may additionally use information in the suggestion query that indicates information already input by the user in determining a value to suggest. For example, the personalized suggestion engine 250 may receive information in the suggestion query for a value for an end date of a car rental that indicates that the user input Jan. 3, 2018 as a start date for a car rental, determine that a date of Dec. 23, 2017 for a return flight of the user would not be a valid date as that date is before the start date of the car rental, determine that the user has another trip with a flight landing on Jan. 3, 2018 and, in response, determine to suggest a return date of Jan. 10, 2018 for that other trip.

The personalized database 260 may store data that is personal to a user. For example, the data may be generated based on e-mails, text messages, search queries, calendar appointments, or other information of a user. For situations in which the systems discussed here collect personal information about users, or may make use of personal information, the users may be provided with controls allowing the user to make an election as to both if and when systems, programs or features described herein may enable collection of user information (e.g., information about a user's social network, social actions or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Different configurations of the system 200 may be used where functionality of the user device 210, form renderer 212, selection detector 214, suggestion query generator 216, suggestion provider 218, personalized suggestion server 240, personalized suggestion engine 250, and personalized database 260 may be combined, further separated, distributed, or interchanged. The system 100 may be implemented in a single device or distributed across multiple devices.

Figure 3:
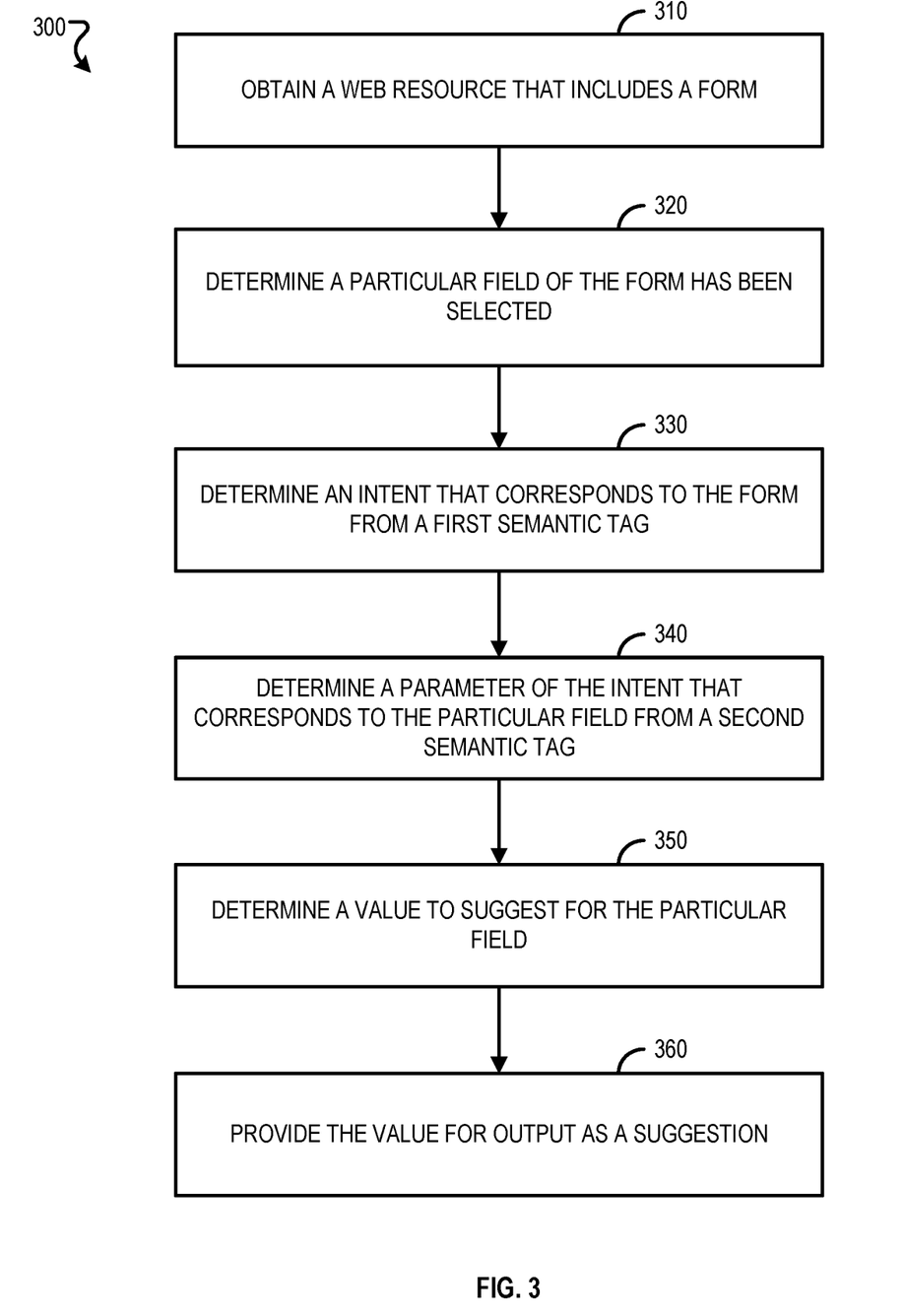
FIG. 3 is a flowchart of an example process for facilitating input by a user into a form.

FIG. 3 is a flowchart of an example process 300 for facilitating input by a user into a form. The following describes the process 300 as being performed by components of the systems 100 and 200 that are described with reference to FIGS. 1 and 2. However, the process 300 may be performed by other systems or system configurations.

The process 300 may include obtaining a web resource that includes a form (310). For example, the user device 110 may obtain an HTML document from a web resource server 120 of a flower delivery provider and the form renderer 212 may then render a form in the HTML document on a display of the user device 110.

The process 300 may include determining a particular field of the form has been selected (320). For example, the selection detector 214 may determine that a user has selected a field for inputting a name of a recipient for flowers where the field has an input tag with an itemprop attribute of "Recipient_Name" and is part of a form with form tag with an itemtype attribute of "Send_Flowers"

The process 300 may include determining an intent that corresponds to the form from a first semantic tag in the web resource (330). For example, the suggestion query generator 216 may determine that the form tag of the form that includes the particular field that is selected has an itemtype attribute of "Send_Flowers."

The process 300 may include determining a parameter of the intent that corresponds to the particular field of the form from a second semantic tag in the web resource (340). For example, the suggestion query generator 216 may determine that the input tag of the particular field that is selected has an itemprop attribute of "Recipient_Name."

The process 300 may include determining a value to suggest for the particular field based at least on the intent and the parameter for the intent (350). For example, the suggestion query generator 216 may provide a suggestion query that indicates an intent of "Send_Flowers," a parameter of "Recipient_Name," and a user id of "75816," the personalized suggestion server 240 may receive the suggestion query, determine that typically users inputting information into an input tagged with a parameter of "Recipient_Name" of a form tagged with an intent of "Send_Flowers" input a name of a contact with an upcoming birthday, access the personalized database 260 to determine contacts of the user with the user id of "75816" with upcoming birthdays, determine that "Jane Doe" and "John Doe" are contacts of the user and have upcoming birthdays, and, in response, provide "Jane Doe" and "John Doe" to the suggestion provider 218 as values to suggest for the particular field.

The process 300 may include providing the value for output as a suggestion of input for the particular field (360). For example, the suggestion provider 218 may receive the suggested values of "Jane Doe" and "John Doe" from the personalized suggestion server 240 and then display "Jane Doe" and "John Doe" as different selectable options in a graphical panel proximate to the selected field.

Figure 4:
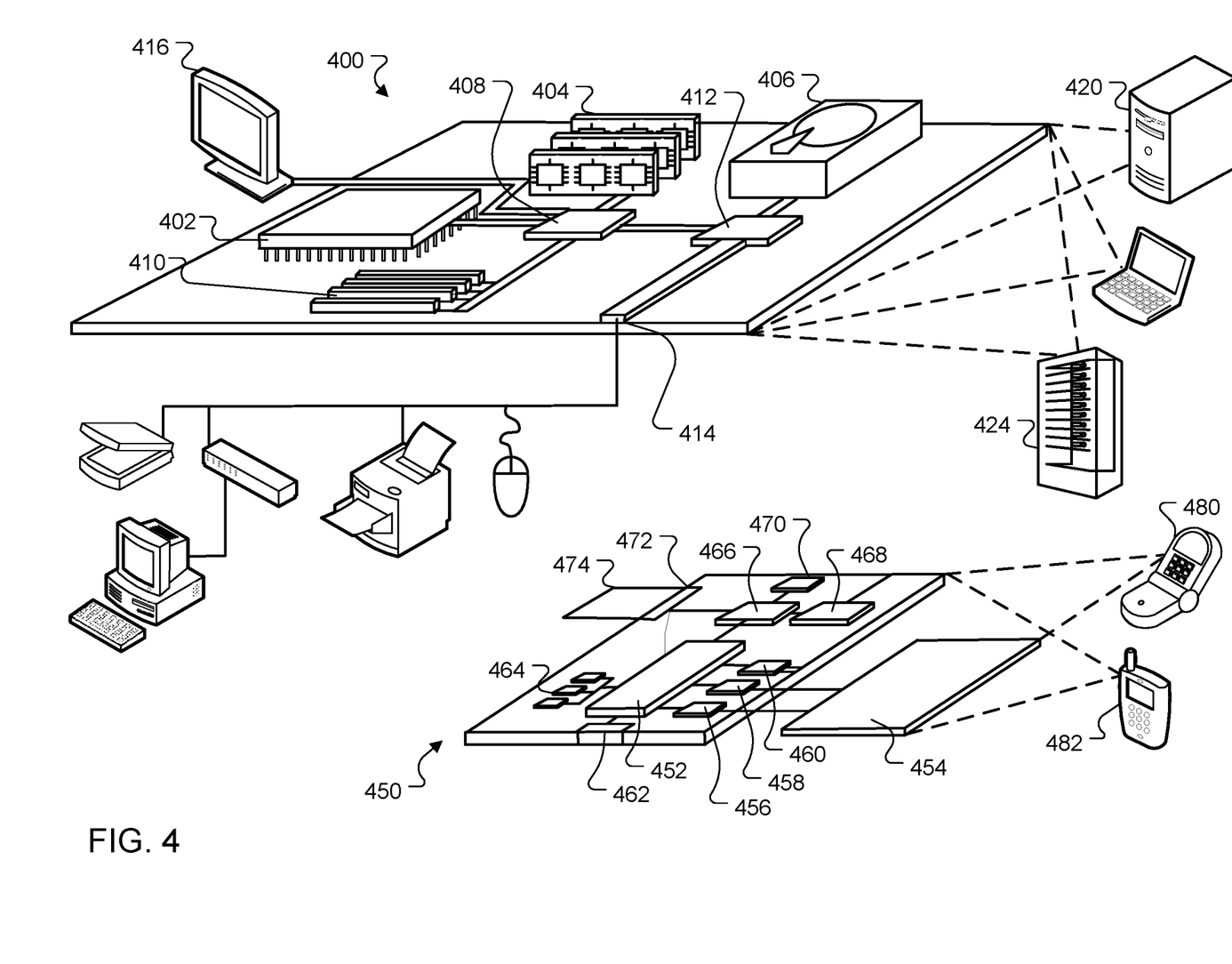
FIG. 4 is a diagram of exemplary computing devices.

FIG. 4 shows an example of a computing device 400 and a mobile computing device 450 that can be used to implement the techniques described here. The computing device 400 is intended to represent various forms of digital computers, such as laptops, desktops, workstations, personal digital assistants, servers, blade servers, mainframes, and other appropriate computers. The mobile computing device 450 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 400 includes a processor 402, a memory 404, a storage device 406, a high-speed interface 408 connecting to the memory 404 and multiple high-speed expansion ports 410, and a low-speed interface 412 connecting to a low-speed expansion port 414 and the storage device 406. Each of the processor 402, the memory 404, the storage device 406, the high-speed interface 408, the high-speed expansion ports 410, and the low-speed interface 412, are interconnected using various busses, and may be mounted on a common motherboard or in other manners as appropriate. The processor 402 can process instructions for execution within the computing device 400, including instructions stored in the memory 404 or on the storage device 406 to display graphical information for a graphical user interface (GUI) on an external input/output device, such as a display 416 coupled to the high-speed interface 408. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 404 stores information within the computing device 400. In some implementations, the memory 404 is a volatile memory unit or units. In some implementations, the memory 404 is a non-volatile memory unit or units. The memory 404 may also be another form of computer-readable medium, such as a magnetic or optical disk.

The storage device 406 is capable of providing mass storage for the computing device 400. In some implementations, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 402), perform one or more methods, such as those described above. The instructions can also be stored by one or more storage devices such as computer- or machine-readable mediums (for example, the memory 404, the storage device 406, or memory on the processor 402).

The high-speed interface 408 manages bandwidth-intensive operations for the computing device 400, while the low-speed interface 412 manages lower bandwidth-intensive operations. Such allocation of functions is an example only. In some implementations, the high-speed interface 408 is coupled to the memory 404, the display 416 (e.g., through a graphics processor or accelerator), and to the high-speed expansion ports 410, which may accept various expansion cards (not shown). In the implementation, the low-speed interface 412 is coupled to the storage device 406 and the low-speed expansion port 414. The low-speed expansion port 414, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. In addition, it may be implemented in a personal computer such as a laptop computer 422. It may also be implemented as part of a rack server system 424. Alternatively, components from the computing device 400 may be combined with other components in a mobile device (not shown), such as a mobile computing device 450. Each of such devices may contain one or more of the computing device 400 and the mobile computing device 450, and an entire system may be made up of multiple computing devices communicating with each other.

The mobile computing device 450 includes a processor 452, a memory 464, an input/output device such as a display 454, a communication interface 466, and a transceiver 468, among other components. The mobile computing device 450 may also be provided with a storage device, such as a micro-drive or other device, to provide additional storage. Each of the processor 452, the memory 464, the display 454, the communication interface 466, and the transceiver 468, are interconnected using various buses, and several of the components may be mounted on a common motherboard or in other manners as appropriate.

The processor 452 can execute instructions within the mobile computing device 450, including instructions stored in the memory 464. The processor 452 may be implemented as a chipset of chips that include separate and multiple analog and digital processors. The processor 452 may provide, for example, for coordination of the other components of the mobile computing device 450, such as control of user interfaces, applications run by the mobile computing device 450, and wireless communication by the mobile computing device 450.

The processor 452 may communicate with a user through a control interface 458 and a display interface 456 coupled to the display 454. The display 454 may be, for example, a TFT (Thin-Film-Transistor Liquid Crystal Display) display or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may provide communication with the processor 452, so as to enable near area communication of the mobile computing device 450 with other devices. The external interface 462 may provide, for example, for wired communication in some implementations, or for wireless communication in other implementations, and multiple interfaces may also be used.

The memory 464 stores information within the mobile computing device 450. The memory 464 can be implemented as one or more of a computer-readable medium or media, a volatile memory unit or units, or a non-volatile memory unit or units. An expansion memory 474 may also be provided and connected to the mobile computing device 450 through an expansion interface 472, which may include, for example, a SIMM (Single In Line Memory Module) card interface. The expansion memory 474 may provide extra storage space for the mobile computing device 450, or may also store applications or other information for the mobile computing device 450. Specifically, the expansion memory 474 may include instructions to carry out or supplement the processes described above, and may include secure information also. Thus, for example, the expansion memory 474 may be provided as a security module for the mobile computing device 450, and may be programmed with instructions that permit secure use of the mobile computing device 450. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier that the instructions, when executed by one or more processing devices (for example, processor 452), perform one or more methods, such as those described above. The instructions can also be stored by one or more storage devices, such as one or more computer- or machine-readable mediums (for example, the memory 464, the expansion memory 474, or memory on the processor 452). In some implementations, the instructions can be received in a propagated signal, for example, over the transceiver 468 or the external interface 462.

The mobile computing device 450 may communicate wirelessly through the communication interface 466, which may include digital signal processing circuitry where necessary. The communication interface 466 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 468 using a radio-frequency. In addition, short-range communication may occur, such as using a Bluetooth, WiFi, or other such transceiver (not shown). In addition, a GPS (Global Positioning System) receiver module 470 may provide additional navigation- and location-related wireless data to the mobile computing device 450, which may be used as appropriate by applications running on the mobile computing device 450.

The mobile computing device 450 may also communicate audibly using an audio codec 460, which may receive spoken information from a user and convert it to usable digital information. The audio codec 460 may likewise generate audible sound for a user, such as through a speaker, e.g., in a handset of the mobile computing device 450. Such sound may include sound from voice telephone calls, may include recorded sound (e.g., voice messages, music files, etc.) and may also include sound generated by applications operating on the mobile computing device 450.

The mobile computing device 450 may be implemented in a number of different forms, as shown in the figure. For example, it may be implemented as a cellular telephone 480. It may also be implemented as part of a smart-phone 482, personal digital assistant, or other similar mobile device.

Embodiments of the subject matter, the functional operations and the processes described in this specification can be implemented in digital electronic circuitry, in tangiblyembodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps may be provided, or steps may be eliminated, from the described processes. Accordingly, other implementations are within the scope of the following claims.

What is claimed is:

1. A computer-implemented method comprising:
   obtaining a web resource that includes a form;
   parsing the web resource to identify fields of the form based on tags in the web resource;
   subsequent to parsing the web resource, modifying the web resource that has been obtained, by automatically inserting script into the web resource that, for each of the fields of the form in the web resource, causes a respective event to be triggered in response to a selection of the field;
   in response to triggering of one of the events by the script that was automatically inserted, subsequent to parsing the web resource, into the web resource, determining that a particular field of the form corresponding to the triggered event has been selected by a user;
   determining an intent that corresponds to the form from a textual description in a form tag that defines the form;
   determining a parameter of the intent that corresponds to the particular field of the form from a textual description in an input tag that defines the particular field;
   generating a suggestion query that includes the intent and the parameter of the intent and providing the suggestion query to a suggestion server;
   receiving, from the suggestion server, a value in response to the suggestion query that includes the intent and the parameter of the intent; and
   providing the value for output as a suggestion of input for the particular field.

2. The computer-implemented method according to claim 1, further comprising:
   receiving an indication from the user to use the value suggested for the particular field; and
   in response to receiving the indication from the user to use the value suggested for the particular field, automatically populating the particular field with the value.

3. The computer-implemented method according to claim 1, wherein determining the intent that corresponds to the form from the textual description in the form tag that defines the form comprises determining the intent from a value of an itemtype attribute in the form tag.

4. The computer-implemented method according to claim 1, wherein determining the parameter of the intent that corresponds to the particular field of the form from the textual description in the input tag that defines the particular field comprises determining the parameter of the intent from a value of an itemprop attribute in the input tag.

5. The computer-implemented method according to claim 1, wherein providing the value for output as the suggestion of input for the particular field comprises providing the value for display in a graphical panel.

6. The computer-implemented method according to claim 1, wherein determining that the particular field of the form has been selected comprises determining that focus is set on the particular field of the form.

7. The computer-implemented method according to claim 1, wherein the value comprises personal information regarding a user that has not previously been provided by the user for populating a form.

8. A system comprising:
   one or more computers; and
   one or more non-transitory storage devices storing instructions that are operable, when executed by the one or more computers, to cause the one or more computers to perform operations comprising:
   obtaining a web resource that includes a form;
   parsing the web resource to identify fields of the form based on tags in the web resource;
   subsequent to parsing the web resource, modifying the web resource that has been obtained, by automatically inserting script into the web resource that, for each of the fields of the form in the web resource, causes a respective event to be triggered in response to a selection of the field;
   in response to triggering of one of the events by the script that was automatically inserted, subsequent to parsing the web resource, into the web resource, determining that a particular field of the form corresponding to the triggered event has been selected by a user;
   determining an intent that corresponds to the form from a textual description in a form tag that defines the form;
   determining a parameter of the intent that corresponds to the particular field of the form from a textual description in an input tag that defines the particular field;
   generating a suggestion query that includes the intent and the parameter of the intent and providing the suggestion query to a suggestion server;
   receiving, from the suggestion server, a value in response to the suggestion query that includes the intent and the parameter of the intent; and
   providing the value for output as a suggestion of input for the particular field.

9. The system according to claim 8, the instructions further being operable to cause the one or more computers to perform operations comprising:
   receiving an indication from the user to use the value suggested for the particular field; and
   in response to receiving the indication from the user to use the value suggested for the particular field, automatically populating the particular field with the value.

10. The system according to claim 8, wherein determining the intent that corresponds to the form from the textual description in the form tag that defines the form comprises determining the intent from a value of an itemtype attribute in the form tag.

11. The system according to claim 8, wherein determining the parameter of the intent that corresponds to the particular field of the form from the textual description in the input tag that defines the particular field comprises determining the parameter of the intent from a value of an itemprop attribute in the input tag.

12. The system according to claim 8, wherein providing the value for output as the suggestion of input for the particular field comprises providing the value for display in a graphical panel.

13. The system according to claim 8, wherein determining that the particular field of the form has been selected comprises determining that focus is set on the particular field of the form.

14. The system according to claim 8, wherein the value comprises personal information regarding a user that has not previously been provided by the user for populating a form.

15. A computer-readable non-transitory medium storing instructions executed by one or more computers which, upon such execution, cause the one or more computers to perform operations comprising:
  obtaining a web resource that includes a form;
  parsing the web resource to identify fields of the form based on tags in the web resource;
  subsequent to parsing the web resource, modifying the web resource that has been obtained, by automatically inserting script into the web resource that, for each of the fields of the form in the web resource, causes a respective event to be triggered in response to a selection of the field;
  in response to triggering of one of the events by the script that was automatically inserted, subsequent to parsing the web resource, into the web resource, determining that a particular field of the form corresponding to the triggered event has been selected by a user;
  determining an intent that corresponds to the form from a textual description in a form tag that defines the form;
  determining a parameter of the intent that corresponds to the particular field of the form from a textual description in an input tag that defines the particular field;
  generating a suggestion query that includes the intent and the parameter of the intent and providing the suggestion query to a suggestion server;
  receiving, from the suggestion server, a value in response to the suggestion query that includes the intent and the parameter of the intent; and
  providing the value for output as a suggestion of input for the particular field.

16. The computer-readable non-transitory medium according to claim 15, the operations further comprising:
  receiving an indication from the user to use the value suggested for the particular field; and
  in response to receiving the indication from the user to use the value suggested for the particular field, automatically populating the particular field with the value.

17. The computer-readable non-transitory medium according to claim 15, wherein determining the intent that corresponds to the form from the textual description in the form tag that defines the form comprises determining the intent from a value of an itemtype attribute in the form tag.

18. The computer-readable non-transitory medium according to claim 15, wherein determining the parameter of the intent that corresponds to the particular field of the form from the textual description in the input tag that defines the particular field comprises determining the parameter of the intent from a value of an itemprop attribute in the input tag.

19. The computer-readable non-transitory medium according to claim 15, wherein providing the value for output as the suggestion of input for the particular field comprises providing the value for display in a graphical panel.

20. The computer-readable non-transitory medium according to claim 15, wherein determining that the particular field of the form has been selected comprises determining that focus is set on the particular field of the form.

* * * * *